(12) United States Patent
Tietz et al.

(10) Patent No.: US 10,989,229 B2
(45) Date of Patent: Apr. 27, 2021

(54) ELECTRO-PNEUMATIC CONVERTER, USE OF AN ELECTRO-PNEUMATIC CONVERTER, POSITIONER, AND CONTROL UNIT

(71) Applicant: SAMSON AKTIENGESELLSCHAFT, Frankfurt am Main (DE)

(72) Inventors: Sebastian Tietz, Mainz (DE); Christian Mellinger, Obertshausen (DE); Stefan Kolbenschlag, Darmstadt (DE)

(73) Assignee: SAMSON AKTIENGESELLSCHAFT, Frankfurt am Main (DE)

( * ) Notice: Subject to any disclaimer, the term of this patent is extended or adjusted under 35 U.S.C. 154(b) by 48 days.

(21) Appl. No.: 16/575,648

(22) Filed: Sep. 19, 2019

(65) Prior Publication Data

US 2020/0096010 A1   Mar. 26, 2020

(30) Foreign Application Priority Data

Sep. 20, 2018  (DE) .......................... 102018123166.0

(51) Int. Cl.
    *F15B 5/00* (2006.01)
    *F15B 13/043* (2006.01)
    *F16K 31/06* (2006.01)

(52) U.S. Cl.
    CPC .............. *F15B 5/006* (2013.01); *F15B 5/003* (2013.01); *F15B 13/0438* (2013.01); *F16K 31/0682* (2013.01); *Y10T 137/2278* (2015.04)

(58) Field of Classification Search
    CPC ...... F15B 5/003; F15B 5/006; F15B 13/0438; F16K 31/0682; Y10T 137/2278
    See application file for complete search history.

(56) References Cited

U.S. PATENT DOCUMENTS

| | | | | |
|---|---|---|---|---|
| 3,580,502 A | * | 5/1971 | Duchek | G01K 1/024 236/102 |
| 4,336,819 A | * | 6/1982 | Nishihara | F15C 3/04 137/82 |

(Continued)

FOREIGN PATENT DOCUMENTS

| | | | |
|---|---|---|---|
| DE | 19818336 C1 * | 1/2000 | ............. F15B 5/003 |
| DE | 19818336 C1 | 1/2000 | |

OTHER PUBLICATIONS

European Committee for Standardization, "Surface Texture: profile method, rules and procedures for the assessment of surface texture", EN ISO4288, Nov. 1997.

(Continued)

*Primary Examiner* — Kevin R Barss
(74) *Attorney, Agent, or Firm* — Steven M. Shape; Dennemeyer & Associates, LLC

(57) ABSTRACT

An adjustable electro-pneumatic converter or transducer based on the nozzle/baffle plate principle is proposed. A defined roughness (Rz) of the baffle plate surface can prevent the occurrence of Bernoulli forces at output pressures close to the initial pressure, i.e. when the exhaust nozzle (140) is almost completely closed by the baffle plate (100). The system thus becomes more dynamically controllable under these conditions. Such a converter can be used to control any consumer system, e.g. air power amplifiers for electro-pneumatic positioners.

12 Claims, 5 Drawing Sheets

(56) References Cited

U.S. PATENT DOCUMENTS

2009/0159135 A1* 6/2009 Kolbenschlag ...... G05D 16/163
                                                    137/82
2017/0292624 A1* 10/2017 Kolbenschlag ....... F16K 31/086
2017/0292627 A1* 10/2017 Kolbenschlag ....... F16K 31/086
2018/0274692 A1*  9/2018 Kolbenschlag ..... F16K 31/0624
2018/0283409 A1* 10/2018 Kolbenschlag ......... F15B 5/003

OTHER PUBLICATIONS

European Committee for Standardization, "Geometrical product specifications (GPS)—surface texture: profile method terms, definitions and surface texture parameters", EN ISO 4287, Jun. 2009.

* cited by examiner

ELECTRO-PNEUMATIC CONVERTER, USE OF AN ELECTRO-PNEUMATIC CONVERTER, POSITIONER, AND CONTROL UNIT

CROSS REFERENCE TO RELATED APPLICATIONS

This application claims priority to German Patent Application No. DE1012018123166 filed Sep. 20, 2018, the content of which is incorporated herein.

DESCRIPTION

Field of the Invention

The invention concerns an electro-pneumatic converter or converter based on the nozzle/baffle plate principle. Such converters, which employ a magnetic principle, are widely used due to their particular robustness and are used e.g. to control positioners in pneumatically driven control valves.

In such a converter or transducer, a baffle plate is moved by means of an electromagnetic transducer system. The opening of the exhaust nozzle in front of the baffle plate can be controlled arbitrarily via the transducer current. The system is supplied with a constant initial pressure $P_v$ via a restrictor. The converter output pressure $P_a$ is tapped between the restrictor and the exhaust nozzle. This can be used to control any consumer system, e.g. air power amplifiers for electro-pneumatic positioners. The output pressure can be adjusted by adjusting the baffle plate and thus controlling the air flow through the exhaust nozzle.

In order for the output pressure $P_a$ to reach the full value of the initial pressure $P_v$, the exhaust nozzle must be closed by the baffle plate. This can only be achieved if the nozzle mouth of the exhaust nozzle and the baffle plate are aligned flat to each other in the corresponding area and also have a very low surface roughness.

A tight-closing baffle plate is not required or desirable for optimum transducer performance. The baffle plate should never completely close the nozzle in order to enable reliable control despite the hysteresis-influenced characteristic curve.

Description of Related Prior Art

Electric-pneumatic converters or transducers based on the nozzle/baffle plate principle are described in detail, for example, in the publication DE 198 18 336 C1, which is integrated into this description by reference. The electro-pneumatic converters according to DE 198 18 336 C1 are characterised by the fact that they can not only switch (binary, on/off), but can also change the output pressure continuously (analogously), i.e. are controllable.

At output pressures $P_a$ close to the initial pressure $P_v$, i.e. when the working air gap between nozzle and baffle plate is particularly small, Bernoulli effects occur with such electro-pneumatic converters: The fast and essentially laminar flowing air, which escapes between the nozzle and the baffle plate, leads to a negative pressure and thus, due to the force resulting from the negative pressure, potentially to the baffle plate sticking to the nozzle. The magnitude of this pressure force depends on the velocity of the air and the overflowed area of the nozzle edge. For a given geometry, the initial pressure determines the velocity of the air. If this "sticking" of the baffle plate occurs, the dynamic controllability of the system suffers, especially at output pressures close to the initial pressure.

OBJECT OF THE INVENTION

The object of the invention is to specify an electro-pneumatic converter or transducer which is better controllable, especially at output pressures close to the initial pressure.

SOLUTION/BRIEF SUMMARY OF THE INVENTION

This object is achieved by the subject of the independent claim. Advantageous developments of the subject of the independent claim are characterized in the subclaims. The wording of all claims is hereby incorporated in the contents of this description by reference.

The use of the singular shall not exclude the plural, which shall also apply in the reverse sense, unless otherwise disclosed.

To achieve the object, an adjustable electro-pneumatic converter having the features according to claim 1 is proposed. This is based on the nozzle/baffle plate principle, having a coil, a magnetic yoke, a rotating armature in the form of a baffle plate and a nozzle with a nozzle aperture which can be closed by the baffle plate. There is always a working air gap between the nozzle edge surface at the aperture of the nozzle and the baffle plate, wherein the working air gap is adjustable depending on the resulting torque due to the pneumatic force repulsing the baffle plate and the magnetic force attracting the armature. The baffle plate and the nozzle edge surface are designed so that the air flows turbulently between them when the nozzle aperture is closed by the baffle plate to a gap less than 30 μm wide. Thereby the initial pressure $P_v$ and the ambient pressure $P_u$ are constant and an output pressure $P_a$ is controlled. The width s of the edge of the nozzle is proportional to the sum of the roughness depths $Rz_P$ of the surface of the baffle plate in the area of the nozzle aperture and $Rz_D$ of the surface of the edge of the nozzle. Therefore, a proportionality factor can be defined between the width s of the edge of the nozzle and the sum of the roughness depths $Rz_P$ of the surface of the baffle plate in the area of the nozzle aperture and $Rz_D$ of the surface of the edge of the nozzle. A good compromise between avoiding the aforementioned Bernoulli effects and the desired tightness of the system with the baffle plate closed is achieved if the proportionality factor $K=s/(Rz_P+Rz_D)$ has a value between 10 and 28, preferably between 15 and 20. K=16 is particularly preferred. The diameter of the bore of the nozzle is regarded as given and is not varied.

At a given initial pressure $P_v$ as well as ambient pressure $P_u$ and a given geometry, this proportionality factor is a measure of whether the air flows in laminar fashion or turbulently between the nozzle edge and the baffle plate. The disadvantageous "sticking" of the baffle plate occurs only with laminar air flow. In turbulent flow, on the other hand, due to the turbulence perpendicular to the main direction of air flow, forces occur which compensate for the negative pressure of the flowing air.

In general there is the prejudice that in the narrow working air gap of a nozzle/baffle plate system the surfaces must be as smooth as possible in order to obtain an undisturbed air flow. This is due to the fact that the pressure difference required to flow through the gap increases sharply with increasing surface roughness. This intuitively leads to a preference for the smoothest possible surfaces at the gap. However, it has surprisingly turned out that a defined roughness of the baffle plate surface and/or the surface of the nozzle edge opposite is advantageous for reducing Bernoulli effects, especially if a narrower design of the nozzle edge is combined with a corresponding roughness of the baffle plate surface. The increased roughness depth compared to a smooth plate prevents the formation of a laminar flow. The flow of the escaping residual air is now rather turbulent, which counteracts Bernoulli forces. By reducing the width of the nozzle edge, the air flow path in the area of the throttle region is also reduced, so that the flow velocity of the escaping air is quickly lowered. As a result the surface roughness depth should be proportionally greater, the wider the edge of the nozzle is. Thus, the positive effect of an increased roughness depth can counteract the negative influence of a wider nozzle mouth rim.

Due to the strongly reduced Bernoulli forces between the baffle plate and the nozzle mouth, an electro-pneumatic converter configured in this way can be dynamically controlled very well even at relatively high output pressures close to the initial pressure. The baffle plate does not tend to stick to the nozzle aperture.

Preferably the baffle plate has a surface roughness depth $Rz_P$ of 2-4 µm in the area of the nozzle aperture. The edge of the nozzle opposite should then have a significantly lower surface roughness depth. This can also be achieved conversely, so that the nozzle edge has a preferred surface roughness depth $Rz_D$ of 2-4 µm. In this case, the baffle plate should have a significantly lower surface roughness depth in the area of the nozzle aperture. Accordingly, it is advantageous if the width s of the edge of the nozzle is 40-56 µm.

The preferred surface roughness of the baffle plate and/or the nozzle can be achieved particularly easily if the baffle plate and/or the nozzle are manufactured using the MIM process ("Metal Injection Molding"). This has the added advantage of significant savings in production costs for high volumes.

Preferably the material of the baffle plate and/or the nozzle has a grain size of 5-20 µm. This ensures that parts produced using MIM can achieve a surface roughness depth of approximately 5 µm.

In the case of baffle plates and/or nozzles manufactured by means of MIM, it is also advantageous if they are post-treated by vibratory grinding (also referred to as trovalising). This allows a slightly too high surface roughness depth of typically 5 µm to be reduced to the preferred value range. It is easier and cheaper to reduce a roughness depth than to increase a roughness.

A less preferred embodiment of the adjustable electro-pneumatic converter has a baffle plate made of sheet metal. In this case it is advantageous if the roughness depth of the baffle plate has been increased by at least one ablative process and/or at least one forming process.

Baffle plates made of sheet metal (e.g. Permenorm or Mumetal) are typically smooth, i.e. have a roughness depth of approximately 1 µm, due to the usual manufacturing processes. The preferred roughness depth specified above can be achieved with the aid of ablative or forming processes such as e.g. grinding, etching or embossing.

To further achieve the object, an electro-pneumatic converter as described can preferably be used in a positioner for a pneumatically actuated control valve.

Such converters are often used in a control loop for an output pressure $P_a$. A further form of application is to use such converters to control the output pressure, where, for example, the initial pressure $P_v$ is used as the manipulated variable.

The object is also achieved solved by a positioner for a pneumatically actuated control valve with an electro-pneumatic converter, as described above, and by a control device for such a control valve, also with an electro-pneumatic converter, as described above.

BRIEF DESCRIPTION OF THE DRAWINGS

Further details and features result from the following description of preferred embodiments in connection with the figures. The respective features may be realized on their own or in combination with each other. The possibilities to solve the problem are not limited to the examples. For example, range specifications always include all—unmentioned—intermediate values and all conceivable partial intervals.

An embodiment is shown schematically in the figures. Identical reference numbers in the individual figures designate identical or functionally identical elements or elements corresponding to each other with regard to their functions. In detail.

DETAILED DESCRIPTION OF THE INVENTION

Figure 1:
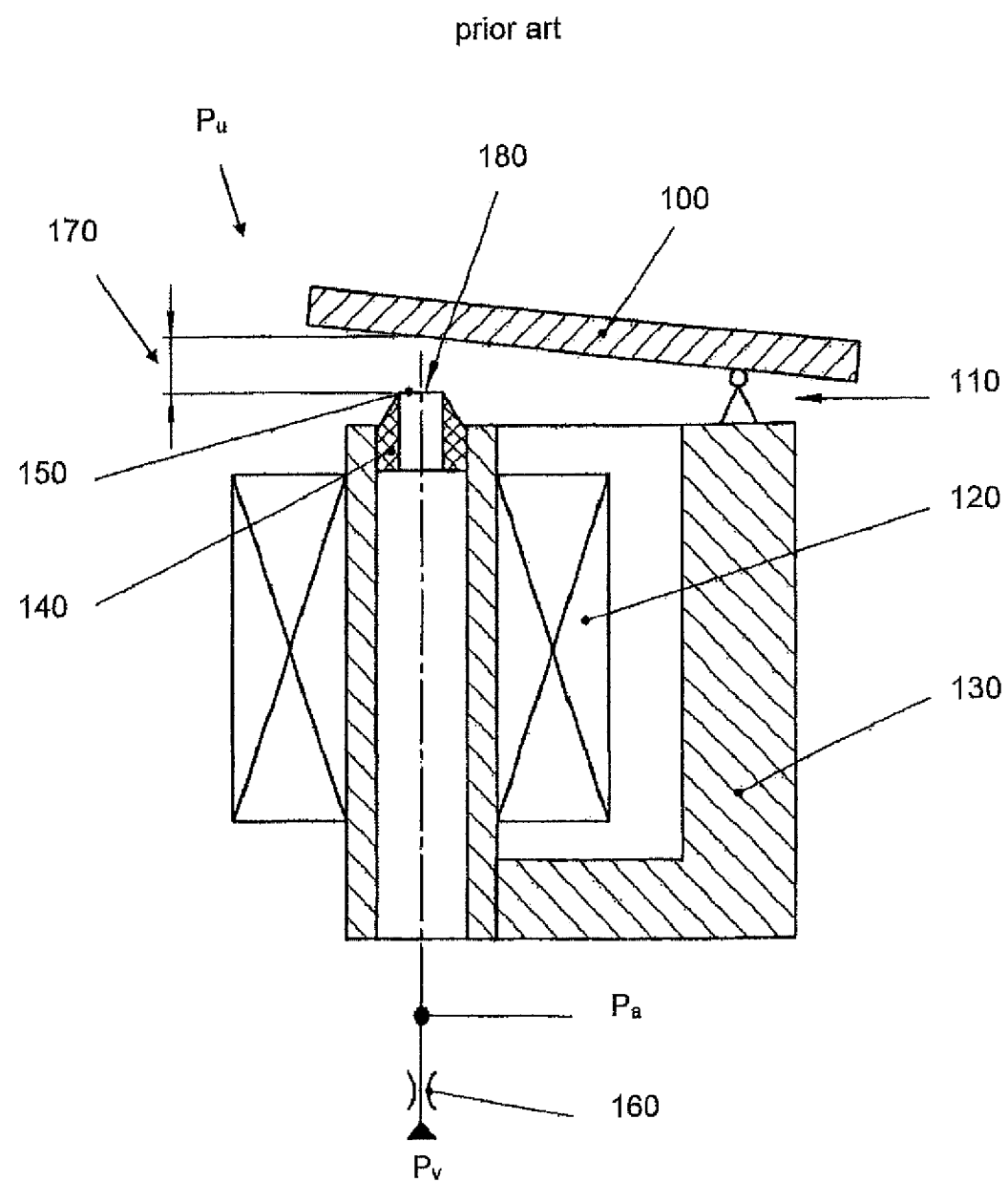
FIG. 1 shows a schematic representation of the typical design of an adjustable electro-pneumatic converter according to the nozzle/baffle plate principle (prior art)

FIG. 1 shows the typical design and the basic function of an adjustable electro-pneumatic converter or transducer according to the nozzle/baffle plate system. The baffle plate 100 consists of a magnetically soft material, typically a nickel-iron alloy (e.g. Permenorm or Mumetal), is rotatably mounted at its one end 110 and is moved via an electro-magnetic transducer system with a coil 120 and a yoke 130. The opening 180 of the exhaust nozzle 140 can be controlled as required via the converter current. This is done by setting a torque equilibrium. The torque caused by the attractive force of the transducer 120, 130 corresponds to the torque caused by the compressed air flowing against the baffle plate 100. The system is supplied with a constant initial pressure $P_v$ via a 160 restrictor. The output pressure $P_a$ of the converter is tapped between the restrictor 160 and the exhaust nozzle 140. This can be used to control any consumer system, e.g. air power amplifiers for electro-pneumatic positioners. The output pressure $P_a$ can be continuously adjusted by adjusting the baffle plate 100 and the air flow. For this, it is important that the shape of the exhaust nozzle 140, its edge 150 and the working air gap 170 between the baffle plate 100 and the exhaust nozzle 140, 150 are matched to each other. This is described in detail e.g. in DE 198 18 336 C1.

In order for the output pressure $P_a$ to reach the full value of the initial pressure $P_v$, the exhaust nozzle 140, 150 must be completely sealed by the baffle plate 100. This can only be achieved if the nozzle orifice 150 of the exhaust nozzle 140 and the baffle plate 100 are aligned flat to each other in the corresponding area and also have a very low surface roughness. In practice, however, this condition cannot be achieved by simple means. A low residual flow always occurs.

Figure 2:
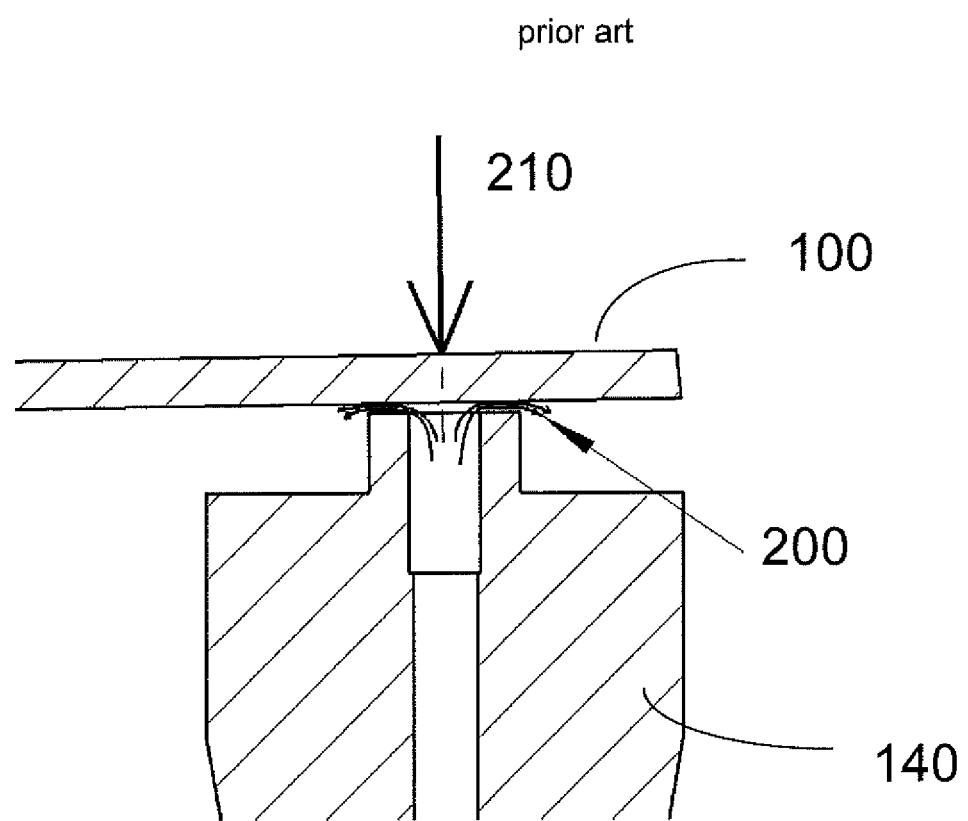
FIG. 2 shows a schematic representation of the occurrence of Bernoulli forces in a nozzle/baffle plate system of an adjustable electro-pneumatic converter according to the prior art.

FIG. 2 shows the negative effects of this residual flow on a nozzle/baffle plate system according to the prior art. In situations where the exhaust nozzle 140 is almost completely closed by the baffle plate 100, i.e. when an output pressure close to the initial pressure is to be set, a constriction occurs between the edge of the nozzle aperture and the smooth baffle plate 100. The residual flow 200 that occurs here is fast and largely laminar in character. Therefore Bernoulli forces 210 occur, which pull the baffle plate 100 against the exhaust nozzle 140. As a result, the baffle plate closes faster and opens more slowly than desired. It therefore tends to "stick".

Figure 3A:
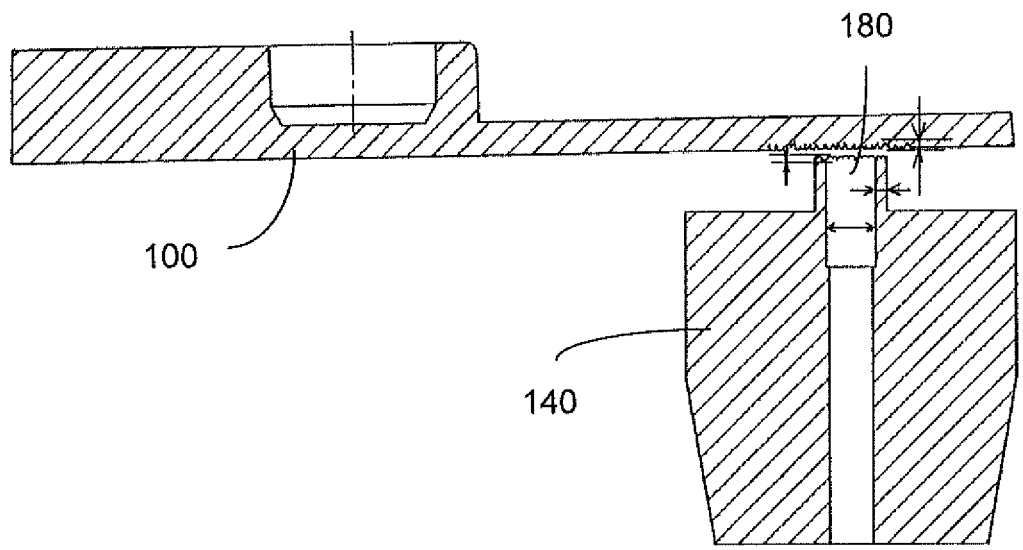
FIG. 3A shows a schematic representation of a nozzle/baffle plate arrangement of an adjustable electro-pneumatic converter according to the invention.
Figure 3B:
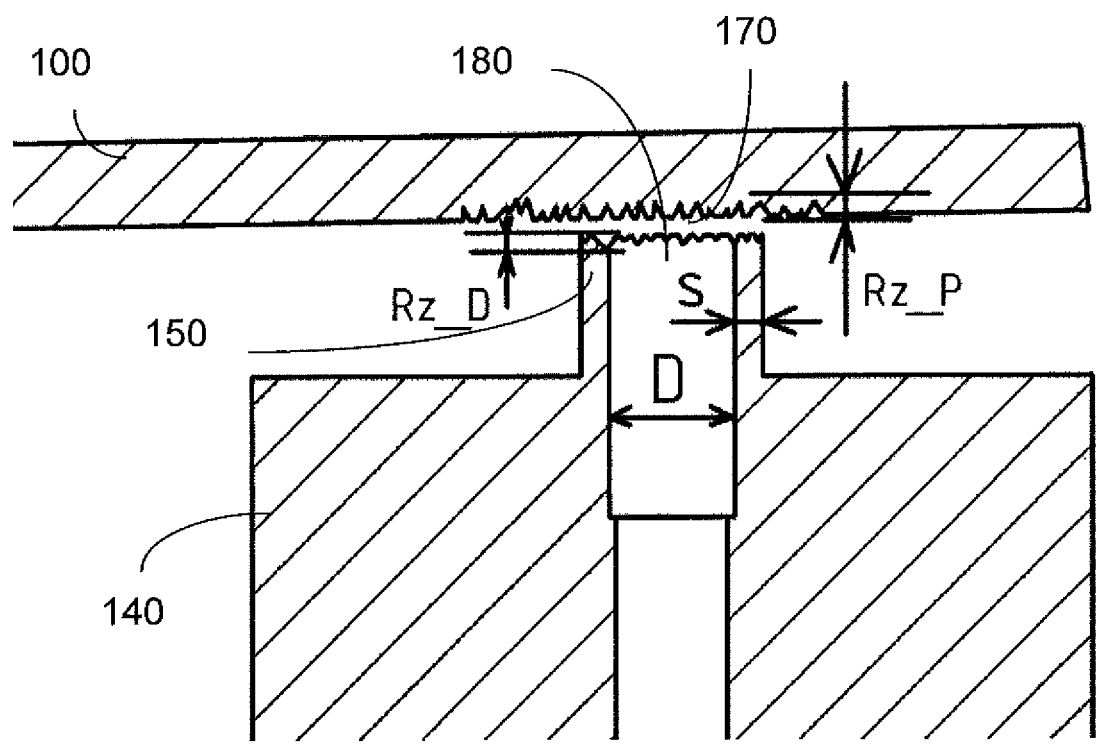
FIG. 3B shows an enlarged section from FIG. 3A.

With an adjustable electro-pneumatic converter according to the invention, as shown in FIG. 3A and FIG. 3B, the width s of the nozzle edge 150 is reduced. In addition, the roughness depth $Rz_P$ of the baffle plate 100 is increased. Alternatively or additionally the roughness depth $Rz_D$ of the nozzle mouth 150 can be increased. Due to the increased roughness depth compared to a smooth baffle plate 100, the formation of a laminar flow is prevented. The flow of residual air 170 escaping between baffle plate 100 and exhaust nozzle 140 is now rather turbulent, which counteracts the occurrence of Bernoulli forces. Due to the reduced width s of the nozzle mouth edge 150, the constriction is also shortened, so that the air reduces its flow velocity again after overcoming this shorter distance.

It turns out that the wider the edge s of the nozzle aperture 150 is, the greater the surface roughness depth Rz of the baffle plate 100 and/or the nozzle aperture edge 150 should be. This means that the positive effect of an increased roughness depth can counteract the negative influence of a wide nozzle aperture rim.

For the optimum value, the proportionality constant K can be specified as characteristic number, which is calculated at a constant diameter of the exhaust nozzle bore D from the quotient of the width s of the nozzle edge and the roughness depth Rz of the corresponding baffle plate surface 100 (and/or the surface of the nozzle mouth edge):

$K=s/Rz$

If the surface roughness of the baffle plate surface is designated $Rz_P$ and the surface roughness of the edge of the exhaust nozzle is designated $Rz_D$, the following applies:

$K=s/(Rz_P+Rz_D)$

In a typical application, the width of the nozzle edge is s=48 μm for an exhaust nozzle 140 with a bore diameter of D=0.9 mm. The nozzle edge is typically smooth. In this case, the optimum surface roughness of the baffle plate 100 is Rz=3 μm.

An optimum value for the proportionality constant K is $K_{opt}=48/3=16$.

It has been shown that sensible values for K range from 10 to 28. With nozzle edge widths of between 40 and 56 μm, for example, useful roughness depths between 2 and 4 μm result.

Such surface roughness depths can be achieved by producing the relevant parts, typically the baffle plate 100, using a MIM process. Baffle plates produced in this way, which can e.g. be made from the basic material Catamold FN50 (BASF) or a similar soft magnetic nickel-iron granulate, typically show a surface roughness depth of about 5 μm after production. This is slightly too high for optimum properties of the nozzle/baffle plate system. However, the desired values can be achieved cost-effectively by subsequent vibratory grinding (so-called trovalization).

When using baffle plates made of smooth sheet metal (soft magnetic nickel-iron, e.g. Permenorm or Mumetal), the surface roughness depth due to the manufacturing process is only about 1 μm. In such a case, however, the desired surface roughness can later be achieved with greater effort by ablative processes such as grinding or etching or by forming processes such as embossing.

Figure 4:
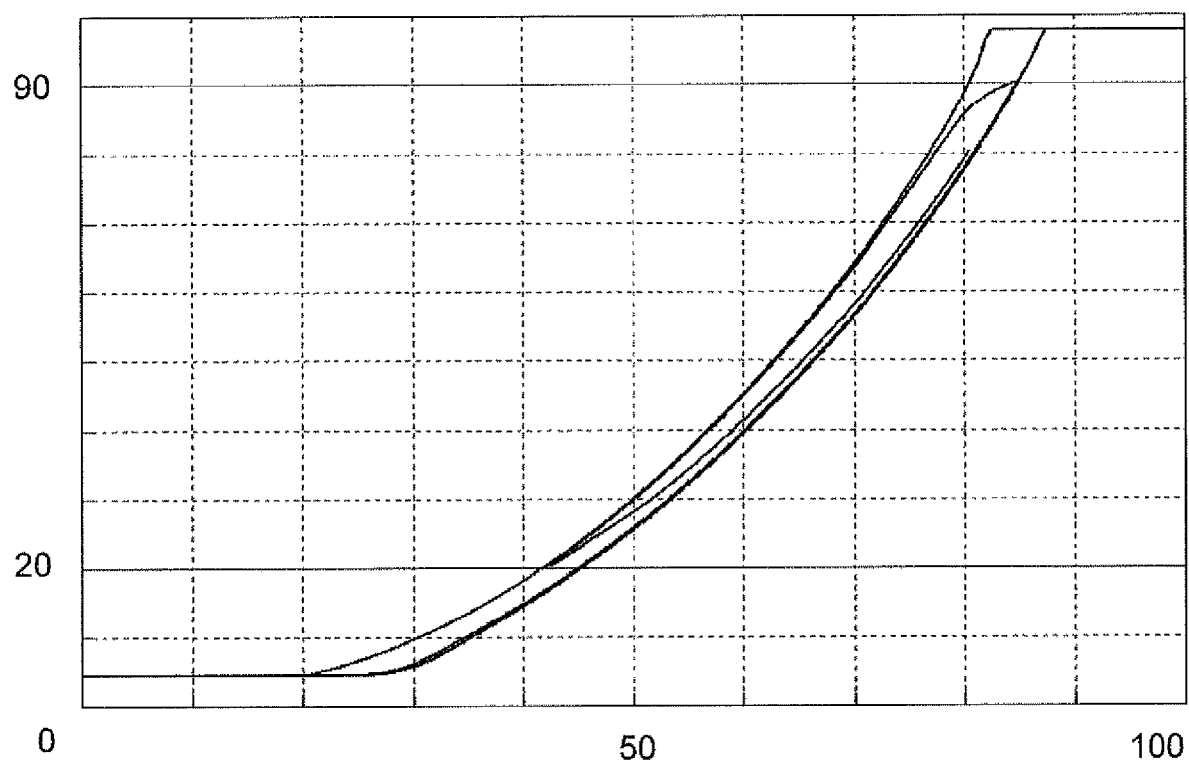
FIG. 4 shows a characteristic curve of an IP converter according to the invention.

FIG. 4 shows the characteristic curve of an analog IP converter according to the nozzle/baffle plate principle described. The outer lines correspond to large-signal operation and the inner lines to small-signal operation. The converter current is plotted in % on the X axis (100% typically corresponds to 1.7 mA) and the output pressure $P_a$ on the Y axis, also in % (100% typically corresponds to 1.8 bar).

The characteristic curve shown is typical for an IP converter with $P_v$=1.80 bar, a restrictor diameter of 0.2 mm and an exhaust nozzle diameter D of 0.9 mm. The full pressure $P_a$=1.80 bar is not completely achieved as output pressure, since the baffle plate never completely closes the nozzle in practice. This is the reason for a residual air flow and—with IP converters according to the prior art—Bernoulli effects.

The characteristic curve shows a clear hysteresis. The main reason for this is the hysteresis of the magnetization characteristic of the soft magnetic material the baffle plate and yoke (including the nozzle) are made of.

The IP converters described are preferably used in electropneumatic positioners. In such a case, the output pressure $P_a$ is supplied to the input chamber by a pneumatic air power amplifier. The air power amplifier is supplied with compressed air (usually 6 bar). Its spring diaphragm system is designed such that it requires only 1.6 bar of the theoretically achievable 1.8 bar at the inlet to reach the full control value (i.e. 6 bar at the outlet). If the pressure falls below 0.4 bar, the output pressure downstream of the air power amplifier becomes zero, which is achieved by an offset spring. The working range limits $P_a\_u$ (0.4 bar, 20%) and $P_a\_o$ (1.6 bar, 90%) are shown in the diagram.

Figure 5A:
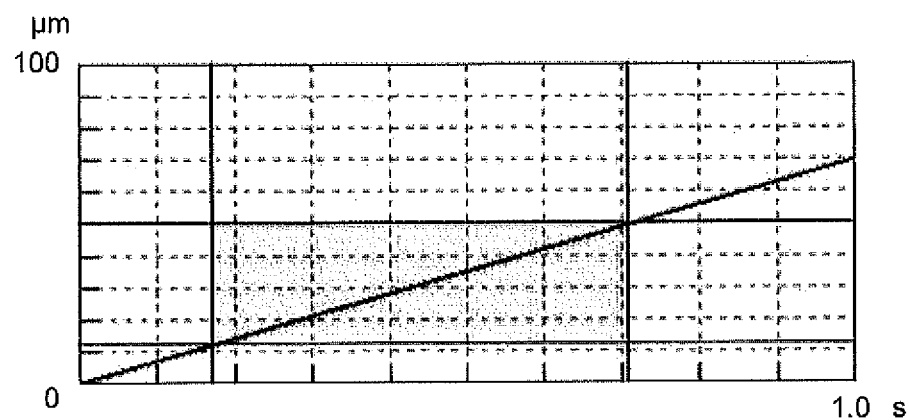
FIG. 5A shows a diagram for the stroke of the baffle plate over the time of a control process.
Figure 5B:
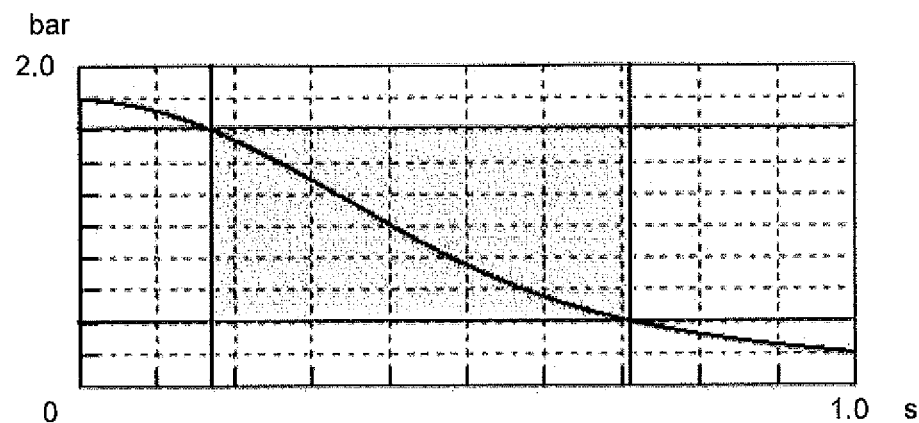
FIG. 5B shows a diagram of the output pressure $P_a$ over the time of a control operation.
Figure 5C:
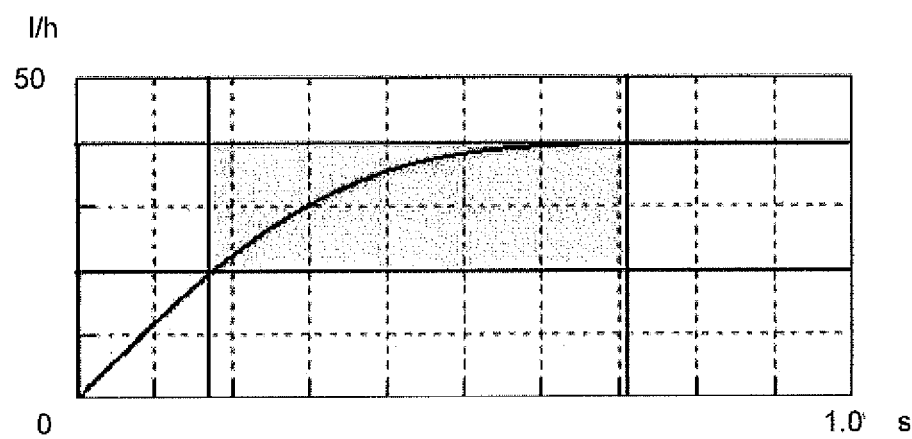
FIG. 5C shows a diagram of the mass flow through restrictor and exhaust nozzle over the time of a control operation.

FIG. 5A shows the stroke of the baffle plate, FIG. 5B the adjusted output pressure $P_a$ and FIG. 5C the mass flow through the restrictor and exhaust nozzle for a typical period of time. As can be seen, the required baffle plate stroke to reverse $P_a$ from 1.6 bar to 0.4 bar (marked by lines or a rectangle within the graph in all figures) is only approx. 40 μm. Above 1.6 bar at the output, the mass flow rate of <20 l/h is very low. The range shortly before is the range in which Bernoulli forces may occur, which interfere with the dynamic controllability of the converter system.

GLOSSARY

Electro-Pneumatic Converter According to the Nozzle/Baffle Plate Principle

Such a converter or transducer has a coil 120, a magnetic yoke 130 and a rotating armature in the form of a baffle plate or impact plate 100. An exhaust nozzle 140, 150 can be closed and reopened by the baffle plate 100, depending on the resulting torque due to the pneumatic force repelling the baffle plate 100 and the magnetic force attracting the armature. The system is also supplied with compressed air with the initial pressure $P_v$. The output pressure $P_a$ is adjusted by opening or closing the exhaust nozzle 140.

MIM

MIM, also known as metal powder injection moulding, stands for "Metal Injection Moulding". Thereby, fine metal powder is mixed with an organic binder and moulded using an injection moulding machine. The binder is then removed and the component sintered in a furnace at high temperature. The result is a purely metallic end product that combines the mechanical advantages of sintered components with the wide range of shapes available in injection molding. Metal injection moulding is an economical manufacturing process for large series products, which is mainly used in the manufacture of small to medium-sized components with a rather complex geometry and a weight of 0.1 to about 150 grams (e.g. hinges for spectacles). A major advantage of this process is that components with demanding geometries, which can only be produced in several parts in conventional processes, can be manufactured in a single piece.

Roughness, Surface Roughness Depth

Roughness parameters and procedures for their measurement and evaluation are defined and regulated e.g. in DIN EN ISO 4287:1998 and DIN EN ISO 4288:1998. Surface roughness is typically measured with a stylus instrument. The surface profile recorded in this way is filtered, for example, by the probe tip radius or the skid of the probe system. Low-pass filtering provides the so-called primary profile (the wavelength $\lambda_s$ for this is standardized and usually preset in the measuring instrument). High-pass filtering of the primary profile with the cut-off wavelength $\lambda_c$, which is selected depending on the expected roughness values, results in the so-called roughness profile. From this, the roughness parameters are evaluated over the measuring section ln, which usually consists of 5 individual measuring sections lr, where lr corresponds to the cut-off wavelength $\lambda_c$ in each case. For each of these individual measuring sections, the largest height difference $Rz_i$ of the roughness profile can be determined. The mean roughness depth Rz is then the mean value of the 5 $Rz_i$ values.

Turbulent and Laminar Flow

A turbulent flow is defined here as a flow in which the Reynolds number is greater than 2300. If a dust or dye is added to the air flowing through the working gap, the presence of a turbulent flow is clearly detected by the characteristic vortices. Laminar flow flows in layers which do not show turbulence even in the transition area between different flow velocities.

REFERENCES 100 baffle plate
110 hinge or bearing
120 coil
130 yoke
140 exhaust nozzle
150 edge of exhaust nozzle
160 restrictor
170 working air gap
180 aperture of exhaust nozzle
200 residual flow
210 Bernoulli force
D inner diameter of nozzle aperture
$P_v$ initial pressure
$P_a$ output pressure
$P_u$ ambient pressure Rz roughness depth (general)
$Rz_P$, Rz_P roughness depth of baffle plate
$Rz_D$, Rz_D roughness depth of nozzle edge surface
s width of edge of nozzle

The invention claimed is:

1. Electro-pneumatic converter having a baffle plate (100), an exhaust nozzle (140, 150) completely or partially closable by said baffle plate (100) with an exhaust nozzle aperture (180) and an output pressure (Pa), wherein
   1.1 the air flows turbulently between the baffle plate (100) and the exhaust nozzle edge surface (150),
   1.2 when the exhaust nozzle aperture (180) is closed by the baffle plate (100) except for a gap (170), wherein the gap (170) is less than 30 μm wide;
   1.3 the initial pressure (Pv) and the ambient pressure (Pu) are constant and an output pressure (Pa) is regulated; and
   1.4 the width (s) of the edge (150) of the exhaust nozzle (140) is proportional to the sum of the roughness depths (Rzp) of the surface of the baffle plate (100) in the area of the exhaust nozzle aperture (180) and $Rz_D$ of the surface of the edge (150) of the exhaust nozzle (140);
   1.4.1 wherein the proportionality factor
   $K=s/(Rz_P+Rz_D)$
   has a value between 10 and 28.

2. Electro-pneumatic converter according to claim 1, wherein the proportionality factor K has a value between 15 and 20, inclusive.

3. Electro-pneumatic converter according to claim 1, wherein the proportionality factor has the value K=16.

4. Electro-pneumatic converter according to claim 1, wherein the baffle plate (100) has a roughness depths (Rzp) of 2-4 μm in the area of the aperture of the exhaust nozzle (180) and/or the edge of the exhaust nozzle (150).

5. Electro-pneumatic converter according to claim 1, wherein the width(s) of the edge (150) of the exhaust nozzle (140) is 40-56 μm.

6. Electro-pneumatic converter according to claim 1, wherein the baffle plate (100) and/or the exhaust nozzle (140, 150) were produced by an MIM process.

7. Electro-pneumatic converter according to claim 1, wherein the material of the baffle plate (100) and/or the exhaust nozzle (140, 150) has a grain size of 5-20 μm.

8. Electro-pneumatic converter according to claim 1, wherein the baffle plate (100) and/or the exhaust nozzle (140, 150) were treated by vibratory finishing.

9. Electro-pneumatic converter according to claim 1, wherein the baffle plate (100) consists of sheet metal; wherein the roughness depth was increased by at least one ablative process and/or at least one forming process.

10. Use of an electro-pneumatic converter according to claim 1 in a positioner for a pneumatically actuated control valve.

11. Positioner for a pneumatically actuated control valve having an electro-pneumatic converter according to claim 1.

12. Control unit for a pneumatically actuated control valve having an electro-pneumatic converter according to claim 1.

* * * * *